US006970910B2

(12) United States Patent
Murai

(10) Patent No.: US 6,970,910 B2
(45) Date of Patent: Nov. 29, 2005

(54) METHOD FOR PARTICIPATING IN NETWORK TYPE GAME, SERVER SYSTEM FOR THE SAME, AND RECORDING MEDIUM UPON WHICH PROGRAM FOR THE SAME IS RECORDED

(75) Inventor: Makoto Murai, Tokyo (JP)

(73) Assignee: Murai Associates Corporation, Tokyo (JP)

(*) Notice: Subject to any disclaimer, the term of this patent is extended or adjusted under 35 U.S.C. 154(b) by 729 days.

(21) Appl. No.: 09/982,743

(22) Filed: Oct. 18, 2001

(65) Prior Publication Data

US 2002/0049813 A1 Apr. 25, 2002

(30) Foreign Application Priority Data

Oct. 24, 2000 (JP) ............................ 2000-324498

(51) Int. Cl.[7] .......................... G06F 15/16; A63F 9/24

(52) U.S. Cl. ........................ 709/209; 709/206; 463/41; 463/2

(58) Field of Search ............................... 709/206, 230, 709/204; 463/41, 42, 22

(56) References Cited

U.S. PATENT DOCUMENTS 5,280,426 A * 1/1994 Edmonds .................... 463/16
5,611,730 A 3/1997 Weiss
6,012,984 A 1/2000 Roseman
6,080,063 A 6/2000 Khosla
6,117,011 A 9/2000 Lvov
6,785,561 B1 * 8/2004 Kim .......................... 455/566
2001/0003100 A1 6/2001 Yacenda
2002/0122137 A1 * 9/2002 Chen et al. ................ 348/552

* cited by examiner

*Primary Examiner*—Kamini Shah
(74) *Attorney, Agent, or Firm*—Wood, Herron & Evans, LLP

(57) ABSTRACT

A moving image for a game which is conducted at a specific location are distributed in real time, so as to implement a network participation type game which has an enhanced feeling of reality. By this game being distributed as a moving image in real time via a transmission line such as the Internet or a telephone line network, and by an unspecified number of people entering into conversation via terminal devices which receive this game, the game conducted at the specific location is executed, and thereby the feeling of reality is increased. Furthermore by including, in this game which is distributed as a moving image, reference time information which absorbs the time difference between the game which is conducted at the specific location and the game which is conducted upon the terminal device, players can participate in this game simultaneously in real time.

8 Claims, 17 Drawing Sheets

METHOD FOR PARTICIPATING IN NETWORK TYPE GAME, SERVER SYSTEM FOR THE SAME, AND RECORDING MEDIUM UPON WHICH PROGRAM FOR THE SAME IS RECORDED

BACKGROUND OF THE INVENTION

1. Field of the Invention

The present invention relates to a method for participating in a network type game, to a server system for the same, and to a recording medium upon which a program for the same is recorded.

2. Description of the Related Art

The spread of portable telephones has become phenomenal in accompaniment with the progress of semiconductor and information transmission technology. Aside from the function of portable telephones for telephony, their explosive spread has been spurred on by their use for receiving services such as electronic mail and WWW (World Wide Web) browsing, in the same way as personal computers.

Among the various services directed towards the above type of portable telephones which have appeared, games (hereinafter termed portable games) are the ones which have been the object of the greatest development by communications providers and manufacturers, and nowadays a brisk flood of portable games, which are the most important type of entertainment type services, is appearing.

Of course in the related art, at the heart of personal computer games, there have been games which have taken advantage of networks, role playing games and the like, but these are different from the above described portable games, because they require procedures such as loading game software into a personal computer and connecting to the network. Since, in contrast to these, portable games are ones in which the user normally utilizes his own portable telephone which can easily be connected to the network, the above procedures can be omitted, and furthermore, since they operate upon a powerful server, the user can at any time evoke an imaginary world by taking advantage of this server, and great efforts are exerted in order to make this imaginary world be as close a copy of the real world as possible.

However, in the final analysis, the above described personal computer games or portable games are games about an imaginary world, and thus, even if the reality which the user experiences becomes deeper with, for example, the development of computer graphics (CG) technique, and furthermore with the enhancement of mutual communication between users and of communication between users and computers, nevertheless the feeling of such a computer game and the feeling of a game in the real world are different. This fact appears particularly prominent in the case of competitive type games.

In other words, although the same games can be found among the games which are played upon personal computers and portable telephones as for example are played in a casino, the feeling of tension and the feeling of actual presence with regard to winning or losing which are experienced when participating in competitive type games which take place in a special gaming environment (such as slot machines, poker, roulette, mini-lottery and the like), is not conveyed, and reality in its deepest sense is lacking.

SUMMARY OF THE INVENTION

The present invention has been conceived of in consideration of the above described background, and its objective is to provide a method for participating in a network type game, a server system therefor, and a recording medium upon which a program for this method is recorded, in which a game which is staged at a specific location is distributed as a moving image in real time via a network such as the Internet, a telephone line network or the like, and, by an unspecified number of users participating in this game which is taking place at the specific location by receiving these images and conversing via terminal devices, it is possible to experience a feeling of tension and a feeling of presence, and in particular the reality of competitive type games is enhanced.

A further objective of the present invention is to provide a method for participating in a network type game, a server system therefor, and a recording medium upon which a program for this method is recorded, in which, an environment is realized in which it is possible to participate in this game simultaneously in real time, by including, in the game distributed by moving images, time period information which absorbs the time difference between the game which is taking place at the specified location and the game which is taking place upon the terminal devices.

In order to achieve the above described objectives, the present invention proposes a method for participating in a network type game, in which a game which is conducted at a specific location is distributed in real time over a transmission line via a server, and a person who desires to participate in the game receives the game via a terminal device, and the person participates in the game which is conducted at the specific location by conversing with the server via the transmission line.

Furthermore, in the above described method for participating in a network type game, it is desirable for the game which is distributed in real time from the server to include moving image data, or of data which is adequate for the terminal device to synthesize a moving image.

Yet further, in the above described method for participating in a network type game, it is desirable for there further to be included, in the game which is distributed in real time, reference time information which absorbs the time difference between the game which is conducted at the specific location and the game which is conducted upon the terminal device.

Even further, in the above described method for participating in a network type game, it is desirable for protection to be provided for points which are deducted due to participation in the game or due to exchange for merchandise so that deduction of points for a subsequent event does not occur before the deduction of points for a previous event has been completed.

And, in order to achieve the above described objectives, the present invention proposes, according to another aspect thereof, a network type game server system which is connected via a transmission line to a terminal device which is operated by a person who desires to participate in a game which is conducted at a specific location, comprising a game distribution section which distributes the game which is conducted at the specific location via the transmission line in real time, and a man-machine control section which performs conversation with the person who wishes to participate in the game via the terminal device, permits the person to participate in the game which is conducted at the specific location, and controls the progress of the game.

And, in the above described network type game server system, it is desirable for time information to be used as reference to be included in the game distributed as moving images, and for there further to be included a time lag control section which absorbs the time difference between the game which is conducted at the specific location and the game which is conducted upon the terminal device by using the time information.

Further, in the above described network type game server system, it is desirable for there further to be included a points control section which provides protection for points which are deducted due to participation in the game or due to exchange for merchandise so that deduction of points for a subsequent event does not occur before the deduction of points for a previous event has been completed.

According to the above described structure, the game which is conducted at the specific location is distributed in real time via a network such as the Internet or a telephone line network, and, by an unspecified number of players entering into conversation via terminal devices which are receiving this game, they can participate in this game which is conducted at the specific location, and thereby it is possible to experience added tension and presence, and, in particular for a competitive type game, it is possible to provide a network participation type game the level of reality of which is increased. Furthermore by including in this game distributed as moving images, reference time information which absorbs the time difference between the game which is conducted at the specific location and the game which is conducted upon the terminal device, it becomes possible to realize an environment in which players can participate in this game simultaneously in real time.

Here, there are two types of method by which a moving image can be delivered in real time so as to be presented upon the participant terminal: in the first such method, the moving image data itself is delivered directly from the game administration server; and, in the second such method, adequate data for synthesizing a moving image is delivered from the game administration server to the terminal device, and the terminal device receives this data and synthesizes moving image data based thereon, and retransmits processed data back to the server. In the case of the former method, the load upon the server is comparatively greater, while in the case of the latter method there is the beneficial aspect that the load upon the server is comparatively lighter. However, special software is required upon the terminal device. Furthermore, in the case of the latter method, it is possible to deliver win rate data for the game prior to the start of the game, and it is possible for the administration company to select this win rate data at will and to distribute it intentionally, so that it is possible to endow the system with flexibility and resilience. However, special software upon the participant terminal is required in order to synthesize this distributed data.

Finally, according to yet another aspect thereof, in order to achieve the above described objectives, the present invention proposes a recording medium upon which is recorded a server program which can be read by a computer which is employed in a network type game server system which is connected via a transmission line to a terminal device which is operated by a person who desires to participate in a game which is conducted at a specific location, wherein the server program includes a first step of distributing the game which is conducted at the specific location via the transmission line in real time, and a second step of performing conversation with the person who wishes to participate in the game via the terminal device, permitting the person to participate in the game which is conducted at the specific location, and controlling the progress of the game.

In this case, it is desirable for the second step of the program which is recorded upon this recording medium to include a step of absorbing the time difference between the game which is conducted at the specific location and the game which is conducted upon the terminal device, using time information to be used as reference which is included in the game distributed as moving images.

Furthermore, it is desirable for the second step of the program which is recorded upon this recording medium to include a step of providing protection for points which are deducted due to participation in the game or due to exchange for merchandise so that deduction of points for a subsequent event does not occur before the deduction of points for a previous event has been completed.

DETAILED DESCRIPTION OF THE PREFERRED EMBODIMENT

Figure 1:
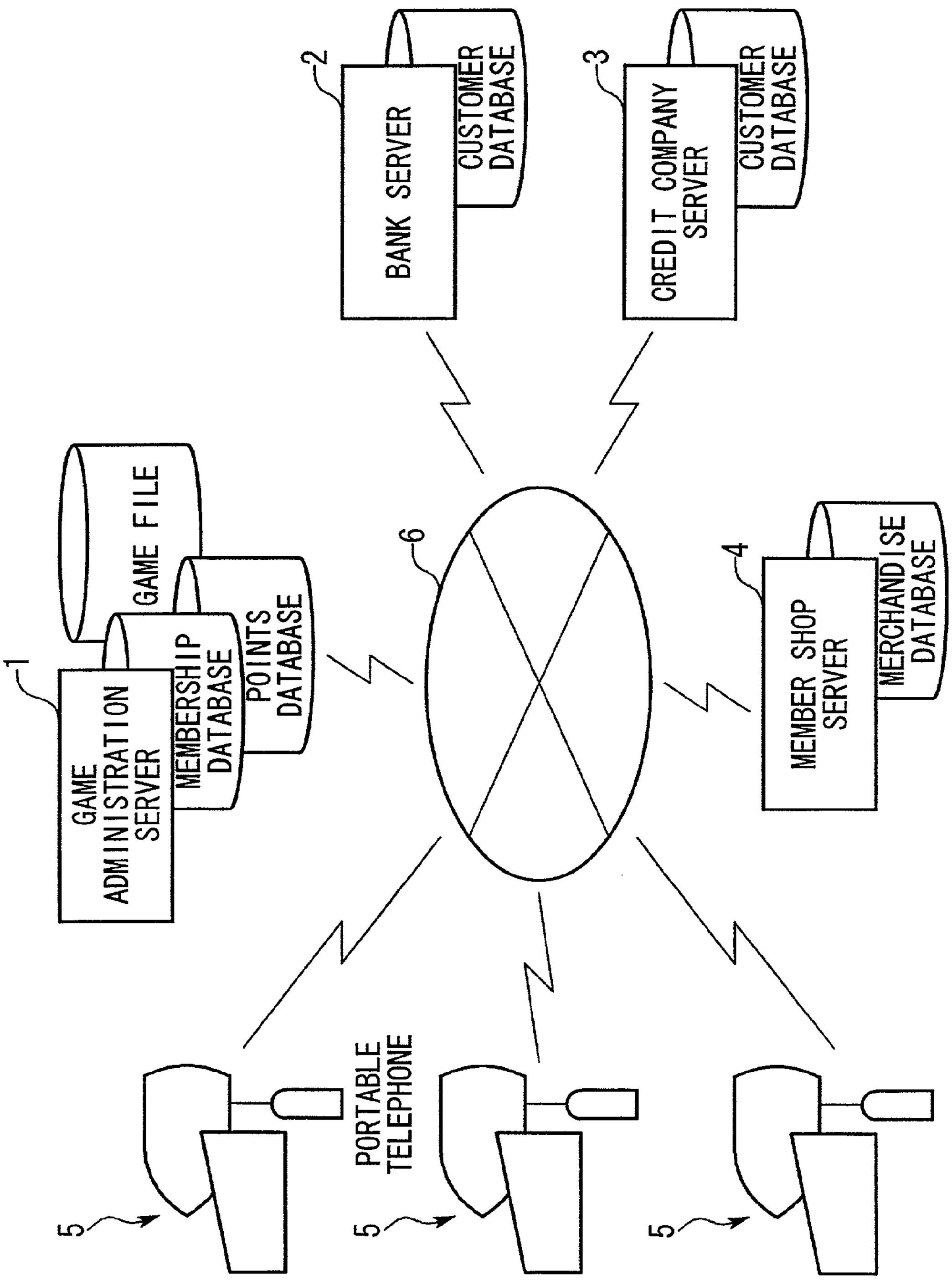
FIG. 1 is a figure showing the mutual relationship between various units which implement the network type game participation method according to the preferred embodiment of the present invention.

FIG. 1 is a figure showing the mutual relationship between the various units which implement the network type game participation method according to the preferred embodiment of the present invention.

Referring to this figure, a group which consists of a game administration company, a financial organization such as a bank, a credit company or the like, and one or more member shops constitutes the nucleus of this system together with a number of game participants, and these entities have servers (a game administration server 1, a financial organization server comprising bank server 2 and a credit company server 3, and a member shop server 4), and these servers and a number of participant terminals 5 such as personal computers, portable telephones or the like are connected together via a transmission line 6 such as the Internet or a telephone line network or the like.

By way of data, a game administration server 1 comprises a membership database, a points database, and a game file (game moving image file) as will be described hereinafter, while a bank server 2 and a credit company server 3 comprise customer databases, and a member shop server 4 comprises a merchandise database.

As seen in FIG. 1, the game administration server 1 transmits a game which is staged at a specific location (a play location or the like) in real time via a transmission line 6, and a user who wishes to participate in this game receives the signal for the game via the transmission line 6 and through a participant terminal 5, and can participate in the game which is being staged at the specified location by conversing with the game administration server 1.

At this time, either moving image data from the game administration server 1 is transmitted in real time to the participant terminal 5, or the same results can be obtained by transmitting data which make it possible for moving image data to be synthesized upon the participant terminal 5, and by performing data processing upon the participant terminal 5 and transmitting the details thereof to the game administration server 1.

It should be noted that, in the latter of the above cases, software is required upon the participant terminal 5 for synthesizing the moving image data from the data which is transmitted. Furthermore, if persons are to participate in the above described game, it will be acceptable for each of these participants to participate from his own respective participant terminal 5, and for there to be no participants in the game which is being staged at the play location described above.

The game transmission and distribution in real time in this preferred embodiment of the present invention may be performed by a so-called streaming distribution type conventional moving image transmission and distribution method. This method is one in which a server continually transmits and distributes moving image data to one or more receiving terminals via a network, and each of these receiving terminals performs sequential replay processing while simultaneously receiving further moving image data, so that as a result real time transmission and distribution of moving images upon the receiving terminals is performed.

The game administration server 1 is a server which is set up at the above described play location at which, for example, a game such as a slot machine, poker, roulette, mini-lottery, or the like is staged. Here the game administration server 1 corresponds to the network participation type game server system of the present invention. It should be understood that a financial organization performs banking procedures, credit procedures, investment procedures and the like with respect to the game funds of the game participants, while member shops perform merchandise management, electronic commerce, mail order sales, and over-the-counter sales when converting points acquired by the game participants, and that these functions are implemented via the bank server 2, the credit company server 3, and the member shop server 4. Exchange of points (for example, imaginary currency such as chips or the like) or allocation to electronic money, and finally exchange into merchandise or the like, is performed between the above described game administration server 1, bank server 2, credit company server 3, member shop server 4, and participant terminals 5. Furthermore, it is possible to cash in the above described electronic money or the above described points.

When implementing the network type game participation method according to this preferred embodiment of the present invention, the financial organization and the member shop or shops are not absolutely indispensable, and in this case the responsibility for administering the credit, banking, and investment tasks for the points described above of the game participants will fall upon the game administration company. Accordingly, at this time, it is not absolutely necessary for the financial organization servers (in other words, the bank server 2 and the credit company server 3) and the member shop server 4 to be connected on-line to the transmission line 6.

Figure 2:
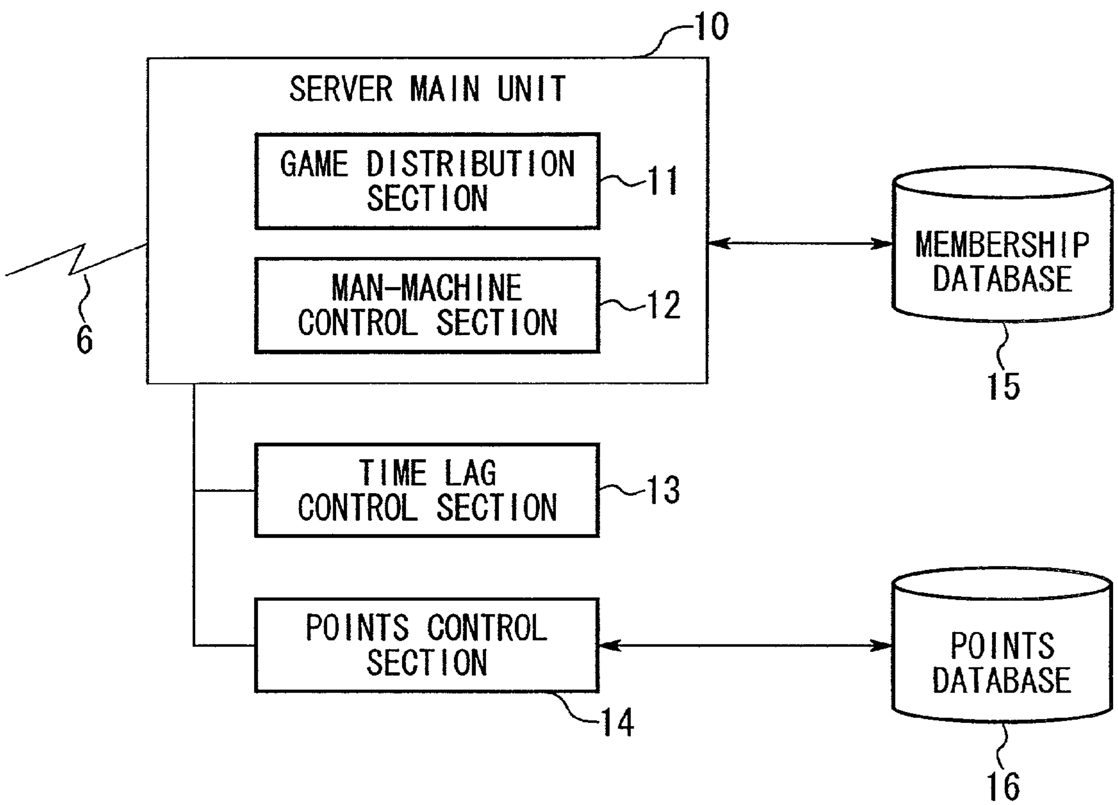
FIG. 2 is a block diagram showing in functional terms the internal structure of the game administration server shown in FIG. 1.

FIG. 2 is a block diagram showing in functional terms the internal structure of the game administration server (the network type game server) 1 shown in FIG. 1. In concrete terms, each of these blocks, which will be described hereinafter, is comprised of a CPU and its peripheral circuitry, and implements its individual function by reading in and executing a program for performing this function which is recorded upon a predetermined recording medium.

This network type game administration server 1 according to the preferred embodiment of the device aspect of the present invention comprises a server main unit 10 which comprises a game distribution section 11 and a man-machine control section 12, a time lag control section 13, a points control section 14, a membership database 15, and a points database 16.

The game distribution section 11 is endowed with the function of distributing the game which is staged at the specified location in real time via the transmission line 6 to the participant terminal 5. Here, the data representing the game which is distributed in real time is supposed to be moving image data. However, it should be understood that it would also be acceptable for this transmitted data to be a type of data from which moving image data can be synthesized upon the participant terminal 5. However, in this case, it becomes necessary to perform data processing upon the participant terminal 5, and it is necessary to transmit the details of this processing to the side of the server. The man-machine control section 12 is endowed with the functions of engaging in conversation with the user who wishes to participate in the game via the participant terminal 5, permitting him to participate in the game which is being performed at the specified location, and also of controlling the progress of the game.

The time lag control section 13 is endowed with the function of absorbing the time difference between the game which is progressing at the specified location and the game which is progressing upon the participant terminal 5, using reference time information which is included in the game of which the moving images are being distributed. This time difference is the elapsed time which is required for the moving image data (the game) which has been distributed from the game administration server 1 to arrive at the participant terminal 5, and it changes according to the distance between the game administration server 1 and the participant terminal 5. For example, the moving image data which has been distributed from the game administration server 1 at the instant t arrives at the participant terminal 5 at the instant [t+•T] after a time difference •T has elapsed which depends upon the distance of the participant terminal 5. Furthermore, since this time difference •T is generally proportional to the distance L between the game administration server 1 and the participant terminal 5, if the distances L of a plurality of participant terminals 5 from the game administration server 1 satisfy the relationship L1>L2> . . . , then the time differences •T satisfy the corresponding relationship $•T_{L1}>•T_{L2}>$ . . . .

If points are deducted when participating in a game or when exchanging for merchandise, the point control section 14 is endowed with a function of providing protection so that deduction of the points for the next event is not performed before the deduction of points for one event has been completed.

And the membership database 15 is a file in which membership data relating to game participants is stored, while the points database 16 is a file in which is stored data specifying, for each membership, the current remaining number of points.

FIGS. 3 through 6 are flow charts showing the operation of this preferred embodiment of the present invention, and they respectively illustrate overall system operation, checking, game start, and points cashing in or exchange for merchandise.

And FIGS. 7 through 17 are figures showing examples of screen displays which are provided upon the participant terminal 5 at various stages during the processes flow charts of which are shown in FIGS. 3 through 6.

In the following, the operation of the preferred embodiment of the present invention shown in FIGS. 1 and 2 will be explained in detail with reference to the flow charts shown in FIGS. 3 through 6 and the example participant terminal screen displays shown in FIGS. 7 through 17.

Figure 3:
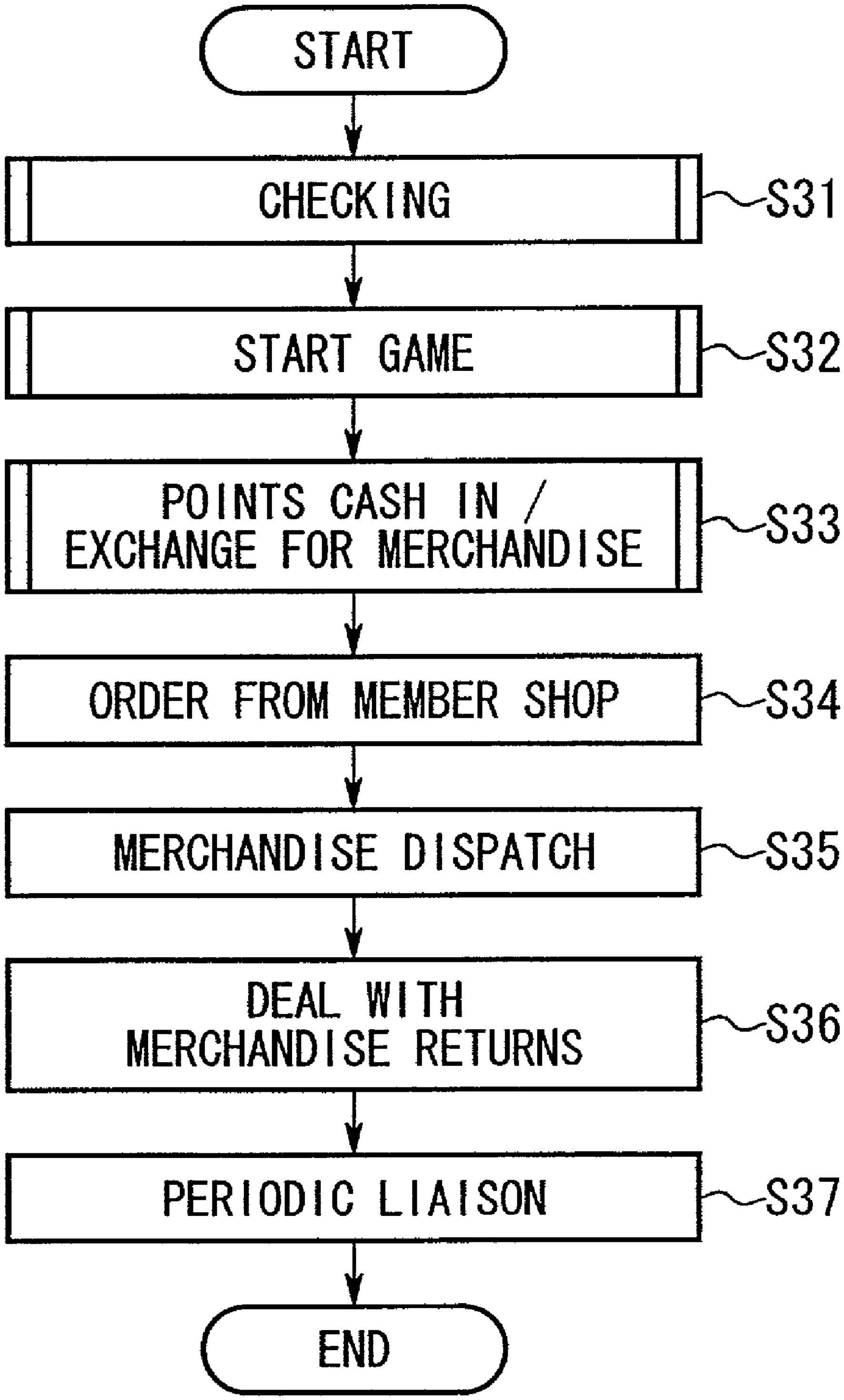
FIG. 3 is a flow chart showing the overall operation of the preferred embodiment of the present invention.

FIG. 3 is a flow chart showing in block form the overall flow of the system according to the preferred embodiment of the present invention. The network type game participation server according to the present embodiment of the present invention executes procedures for checking (a step S31), game start (a step S32), points cashing in/exchange for merchandise (a step S33), ordering from a member shop (a step S34), merchandise dispatch (a step S35), dealing with returns of merchandise (a step S36), and periodic liaison (a step S37); and, among these, the detailed procedures for checking (the step S31), game start (the step S32), and points cashing in/exchange for merchandise (the step S33), are respectively shown in detail in FIGS. 4 through 6, since they have an intimate relationship with the nexus of the present invention.

Figure 4:
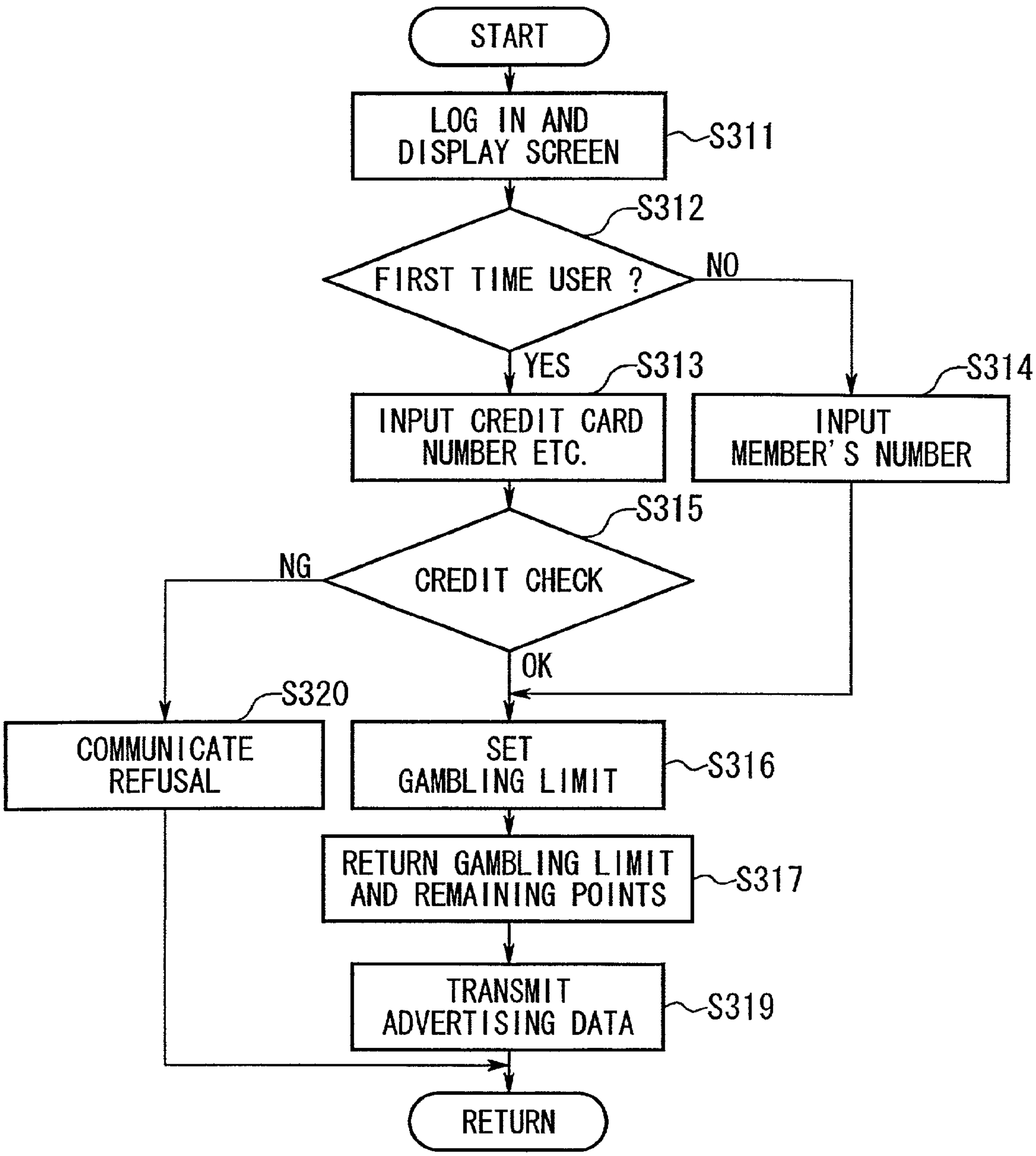
FIG. 4 is a flow chart showing the details of a block "CHECKING" in the FIG. 3 flow chart.

First, the "checking" procedure shown in FIG. 4 will be explained. First, in a step S311, the game participant operates the participant terminal 5 and, by visiting the website of the game administration company, is able to display a screen shown in FIG. 7. Here, the game participant operates the participant terminal 5 and inputs a member's number (secret number).

Next, in the steps S312 and S313, if this is the first time that this person has participated in the game, he inputs data such as his credit card number, date of birth, and the like. Alternatively, the game administration server 1 reads all the data input by the game participant (in the step S314), records membership data in the membership database 15, and generates a database member's number. In subsequent steps, administration is performed by using this member's number.

Along with performing identity check by voice recognition or the like so as to verify the user's identity, the game administration server 1 also, for example, makes a reference to the credit company server 3 (in a step S315), and determines upon a gambling limit via a credit investigation (in a step S316). If the result of the reference is that this aspirant user is not a qualified person, then a message to this effect is communicated to him (in a step S320) and the flow of this procedure terminates.

If this aspirant user is a qualified person, then in a step S317 reference is made to the points database 16, and a response is sent to the participant terminal 5 to inform this game participant of the gambling limit which has been decided upon and of the total number of remaining points. After the game participant has acknowledged this message, he clicks the game start button which is provided upon the screen.

Figure 17:
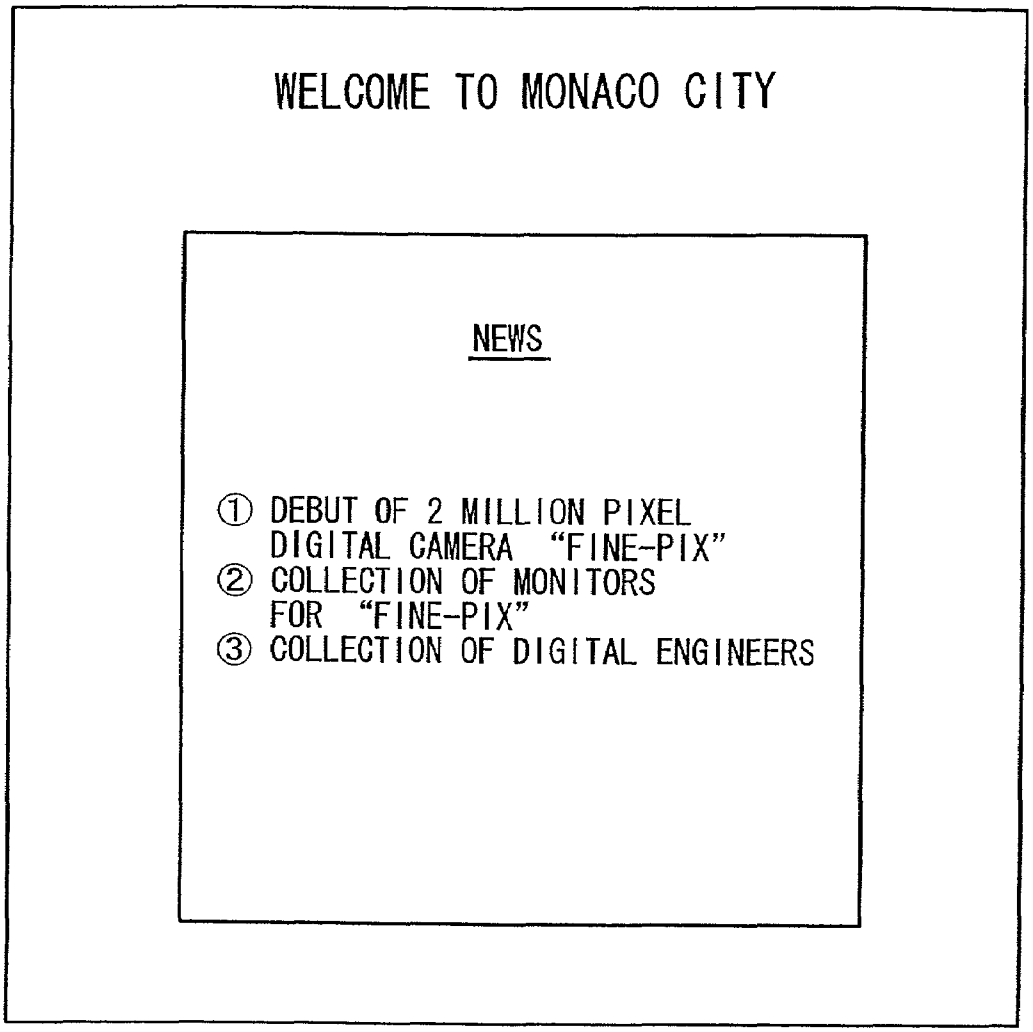
FIG. 17 is a figure showing an example of a screen display which is provided upon the participant terminal shown in FIG. 1.

Moreover, by clicking an advertising agreement button which is provided upon the screen, it is also possible, by entering into an agreement with a member shop, to display (in the step S319) advertising data. An example of such an advertising data display screen is shown in FIG. 17.

Figure 8:
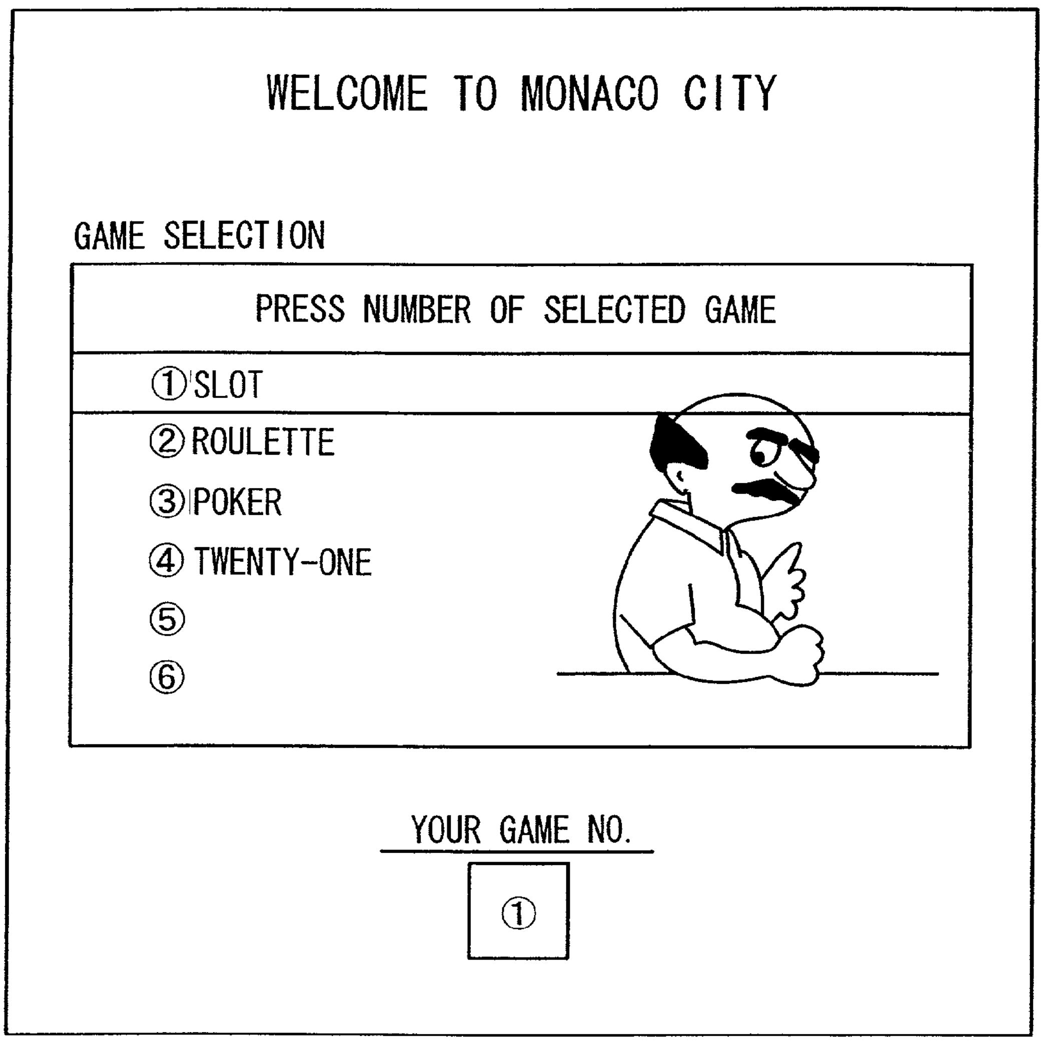
FIG. 8 is a figure showing an example of a screen display which is provided upon the participant terminal shown in FIG. 1.
Figure 9:
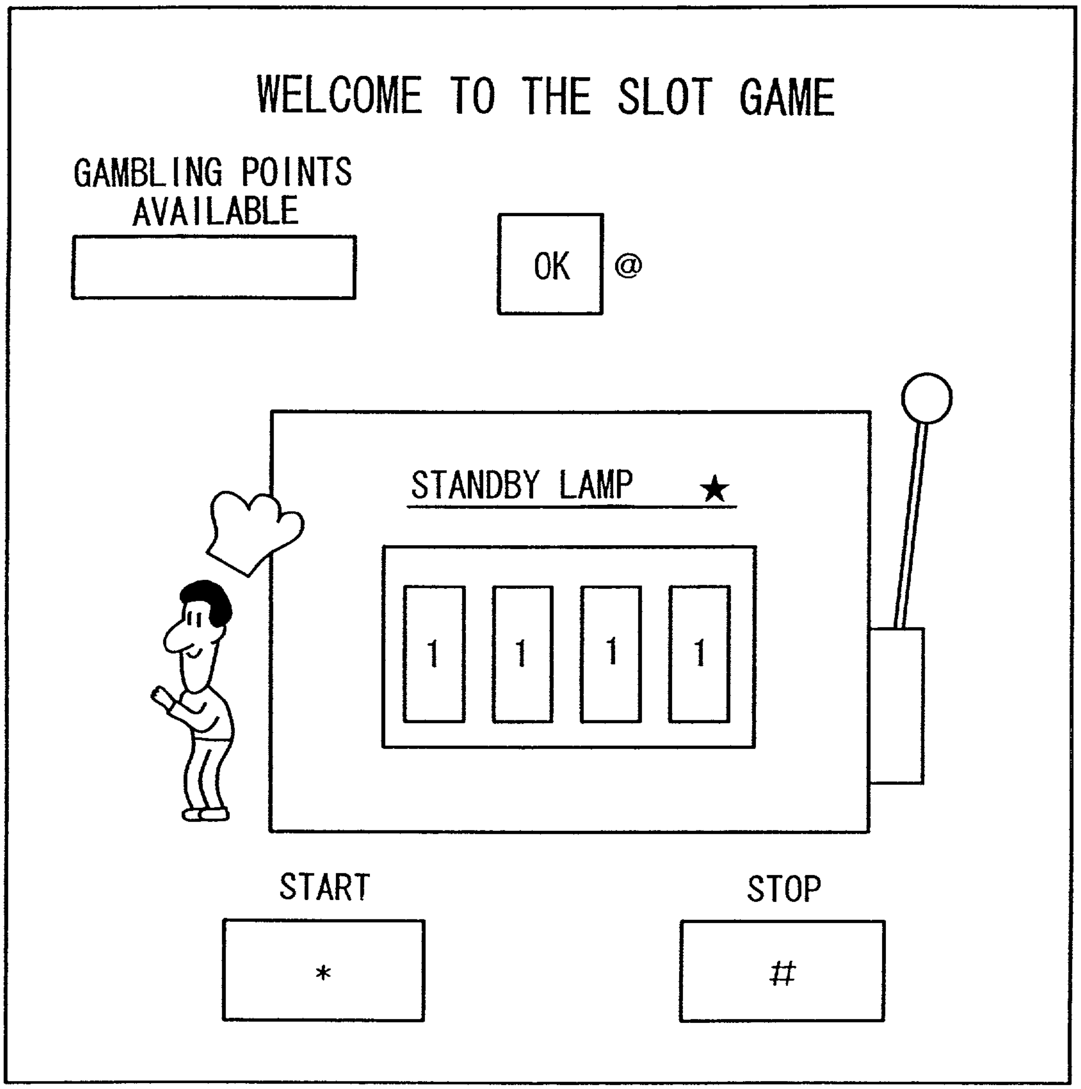
FIG. 9 is a figure showing an example of a screen display which is provided upon the participant terminal shown in FIG. 1.

Next, the "game start" procedure shown in FIG. 5 will be explained. First, by the game participant clicking (in a step S321) a game start button which is provided upon the screen, a game selection screen shown in FIG. 8 is displayed upon the participant terminal 5 (in a step S322). On this screen, if the game participant selects the game "slot", the game home screen ("Welcome to the Slot Game") shown in FIG. 9 is displayed (in steps S323 and S324).

Figure 10:
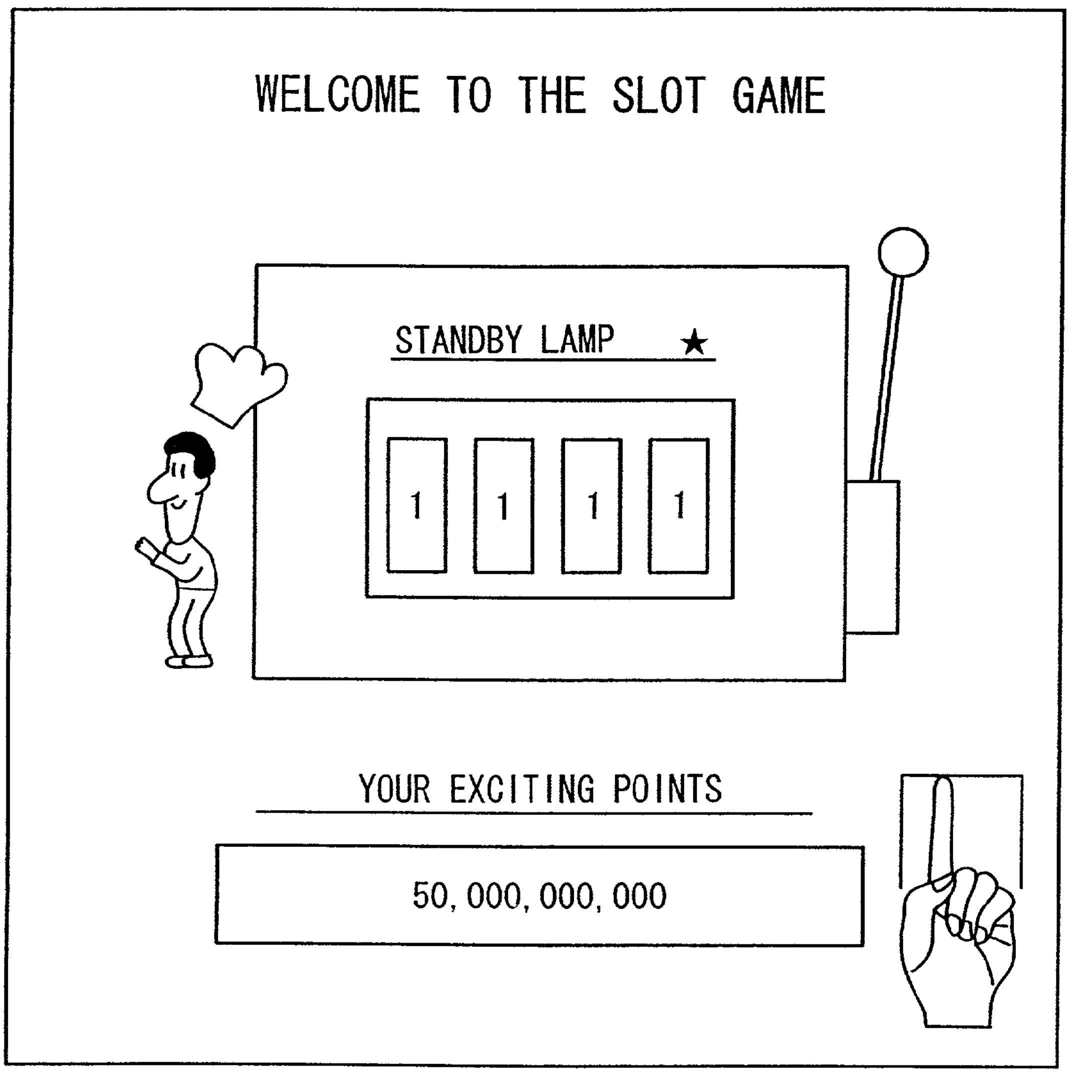
FIG. 10 is a figure showing an example of a screen display which is provided upon the participant terminal shown in FIG. 1.

The game participant sets the number of points which he wishes to gamble in the entry box upon this screen, and (in a step S325) clicks the OK button which is provided upon this screen. When he does this, the moving image simulation of a slot machine as shown in FIG. 10 is displayed, and he is able to enter upon the game (in a step S326). Four rotating columns of digits are displayed on this screen, and the game participant, using the participant terminal 5, can fix the numerals in each rotating column by clicking the start button and the stop button which are provided upon this screen.

It should be understood that, each time the start button or the stop button upon this screen is clicked, the participant terminal 5 dispatches (in a step S327) a lock signal to the game administration server 1 for absorbing the time lag (the time difference), and also transmits a numeral lock screen which corresponds to this lock signal.

Moreover, in the game information which is distributed in real time from the game administration server 1 to the participant terminal 5—in this case, the slot game—reference time information is included which absorbs the time difference between the slot game which is proceeding at the specified location at which the game administration server 1 is set up, and the slot game which is taking place upon the participant terminal 5, and actual time information is obtained by the time lag control section 13 of the game administration server 1 as described above, using this reference time information. The time lag control section 13 receives the above described lock signal, and, by comparing it with the reference time information, is able to obtain the actual time information. For example if, in the game administration server 1, a lock signal which has been dispatched from the participant terminal 5 is received at the time instant "19:00:30", and the time instant information (reference time information) "19:00:00" is appended to the numerical lock screen which is sent along with this lock signal, then the time lag control section 13 subtracts the latter time instant from the former time instant to obtain a time difference (time lag) of 30 seconds, and then absorbs the time difference between the game which is taking place at the above described specified location and the game which is taking place upon the participant terminal 5, based upon this time difference of 30 seconds.

Furthermore, the reference time information is distributed at fixed intervals from the time lag control section 13 of the game administration server 1 to the participant terminal 5, and, based upon the reference time information, the time of arrival of information from the game administration server 1 to the participant terminal 5, or from the participant terminal 5 to the game administration server 1, can be calculated whenever required; and it is possible to perform correction of the data from the game administration server 1, or to determine and to correct a common time between the game participants and the game administration company. In the former case, when for example the time instant of reception by the game administration server 1 of response information which is sent from the participant terminal 5 in response to distributed reference time information of "15:10:00" is "15:10:50", then the time lag control section 13 may correct the time difference based upon the difference 50 seconds which is obtained by the same process as described above. On the other hand, in the latter case, when for example correcting the respective time instant information in the game administration server 1 and the participant terminal 5 according to specific reference time instant information (for example world standard time), then the time lag control section 13 may correct the time difference based upon a time difference of 20 seconds, which is obtained by the same process as described above from the present time instant information (for example "16:30:20" which is transmitted from the participant terminal 5 and the time instant of reception by the game administration server 1 (for example "16:30:40").

Figure 5:
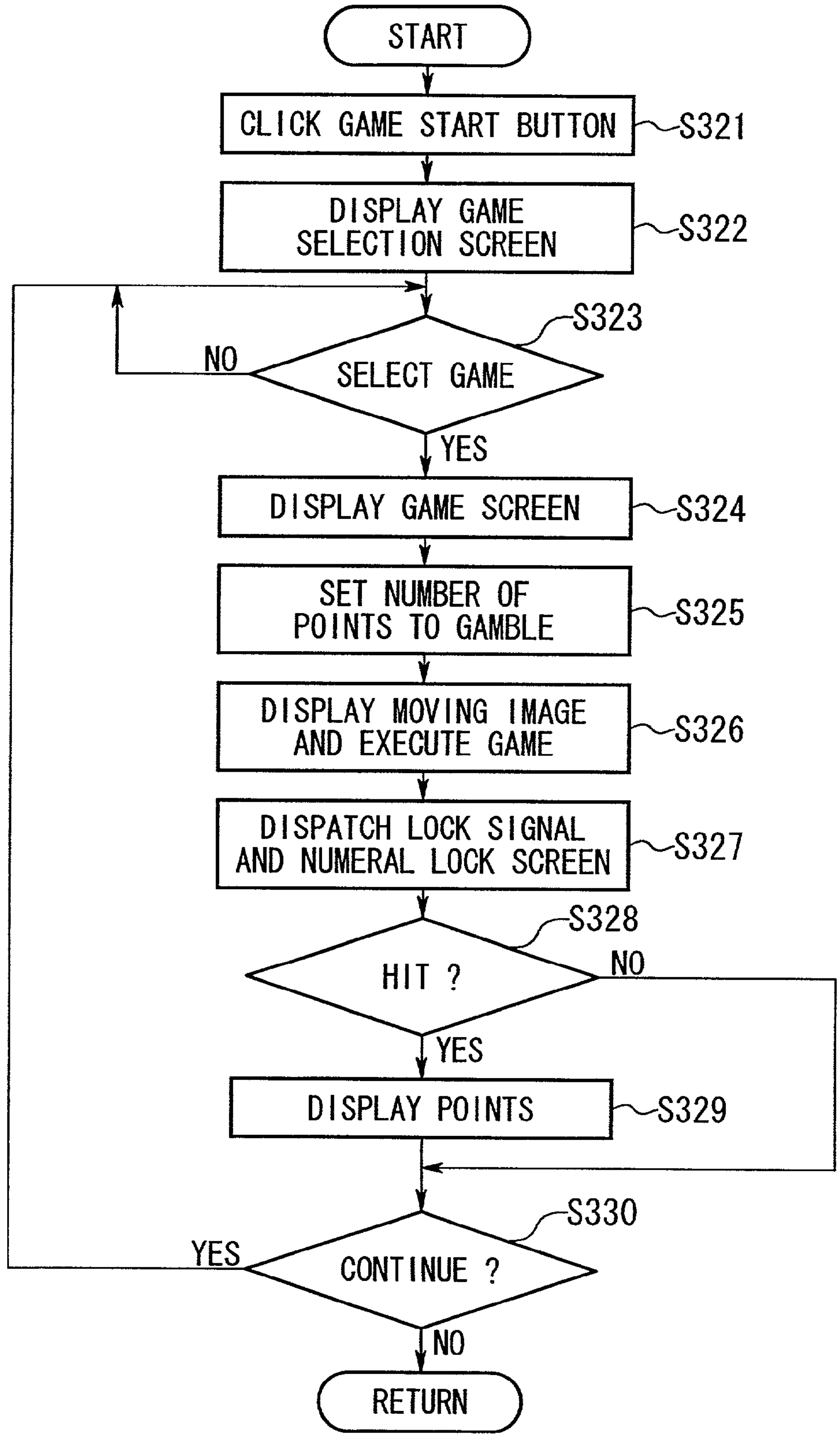
FIG. 5 is a flow chart showing the details of a block "START GAME" in the FIG. 3 flow chart.
Figure 11:
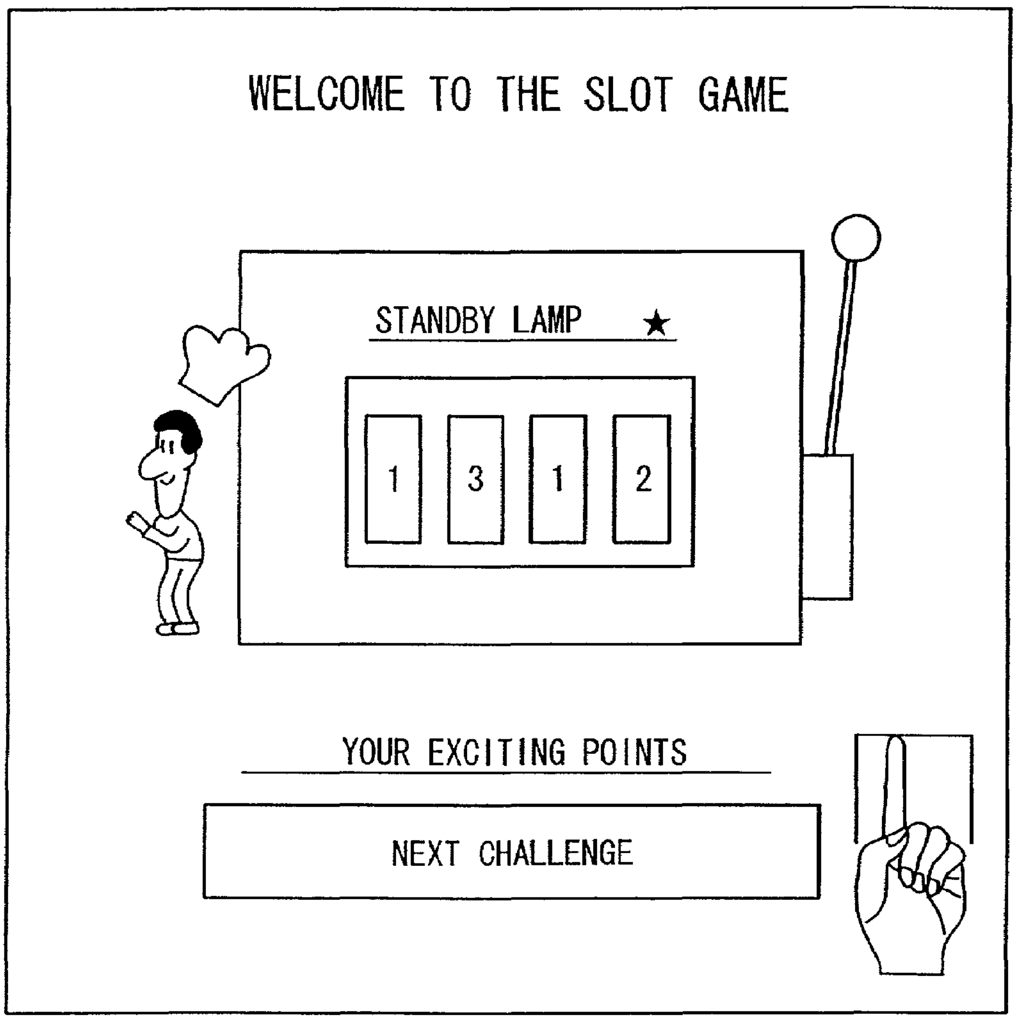
FIG. 11 is a figure showing an example of a screen display which is provided upon the participant terminal shown in FIG. 1.
Figure 12:
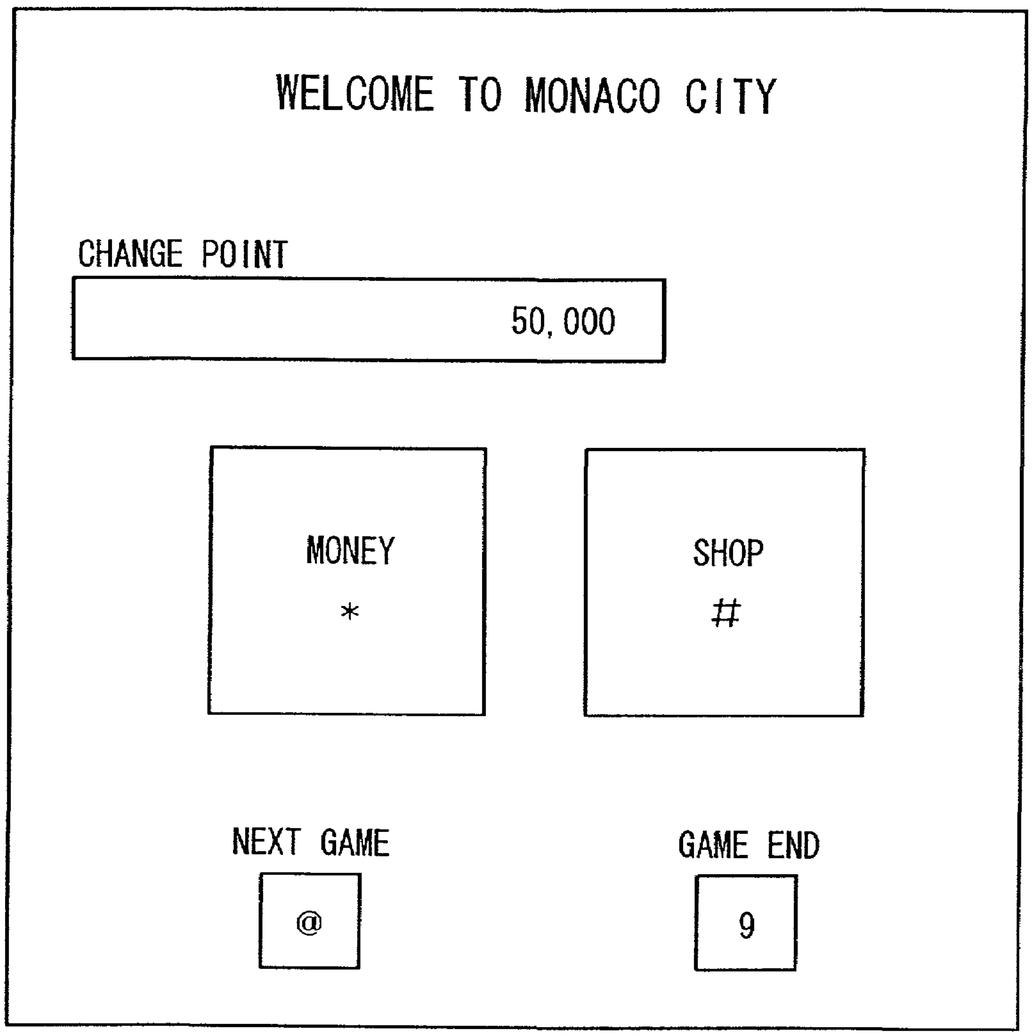
FIG. 12 is a figure showing an example of a screen display which is provided upon the participant terminal shown in FIG. 1.

To return to the explanation of FIG. 5, when the game finishes, either the "hit" screen shown in FIG. 12 or the "miss" screen shown in FIG. 11 is displayed as a game end screen. In the case of a "hit" (a step S328), then the screen shown in FIG. 12 is displayed, and the points gained and the points total are displayed (in a step S329).

And, the game administration server 1 invites (in a step S330) the game participant to choose either to cash in some or all of his points by clicking upon a "money" button, to exchange some or all of his points for merchandise by clicking upon a "shop" button, to continue with another game by clicking upon a "next game" button, or to terminate the game by clicking upon a "game end" button.

Figure 6:
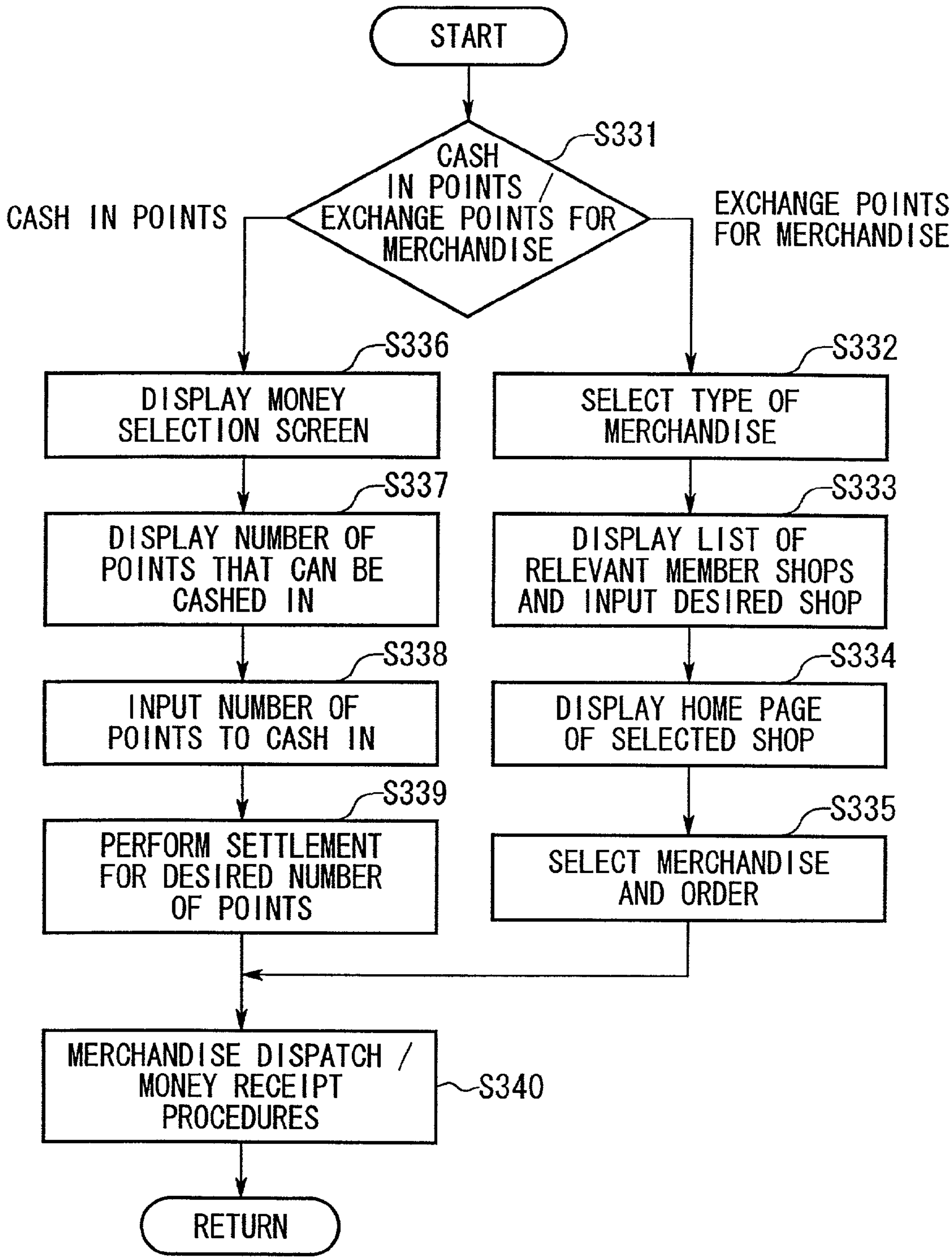
FIG. 6 is a flow chart showing the details of a block "POINTS CASH IN/EXCHANGE FOR MERCHANDISE" in the FIG. 3 flow chart.
Figure 7:
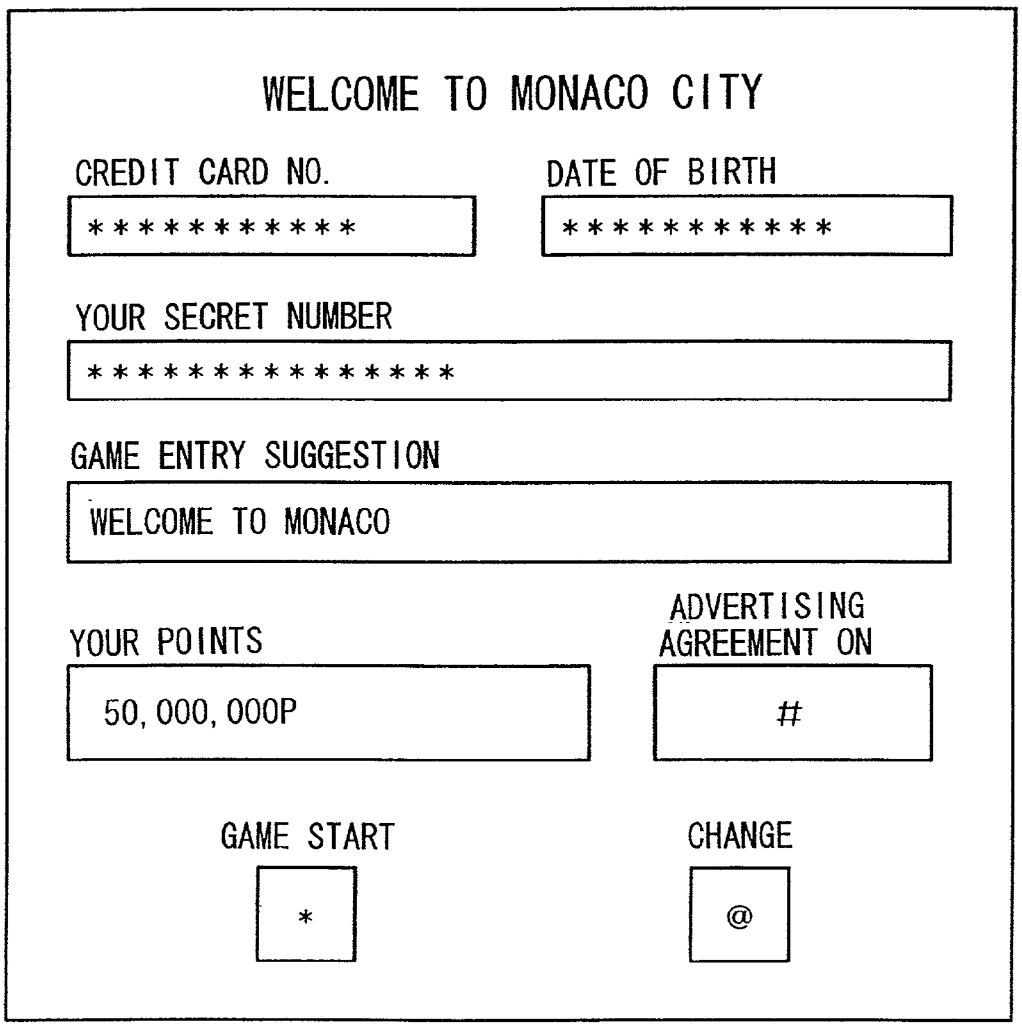
FIG. 7 is a figure showing an example of a screen display which is provided upon a participant terminal shown in FIG. 1.
Figure 13:
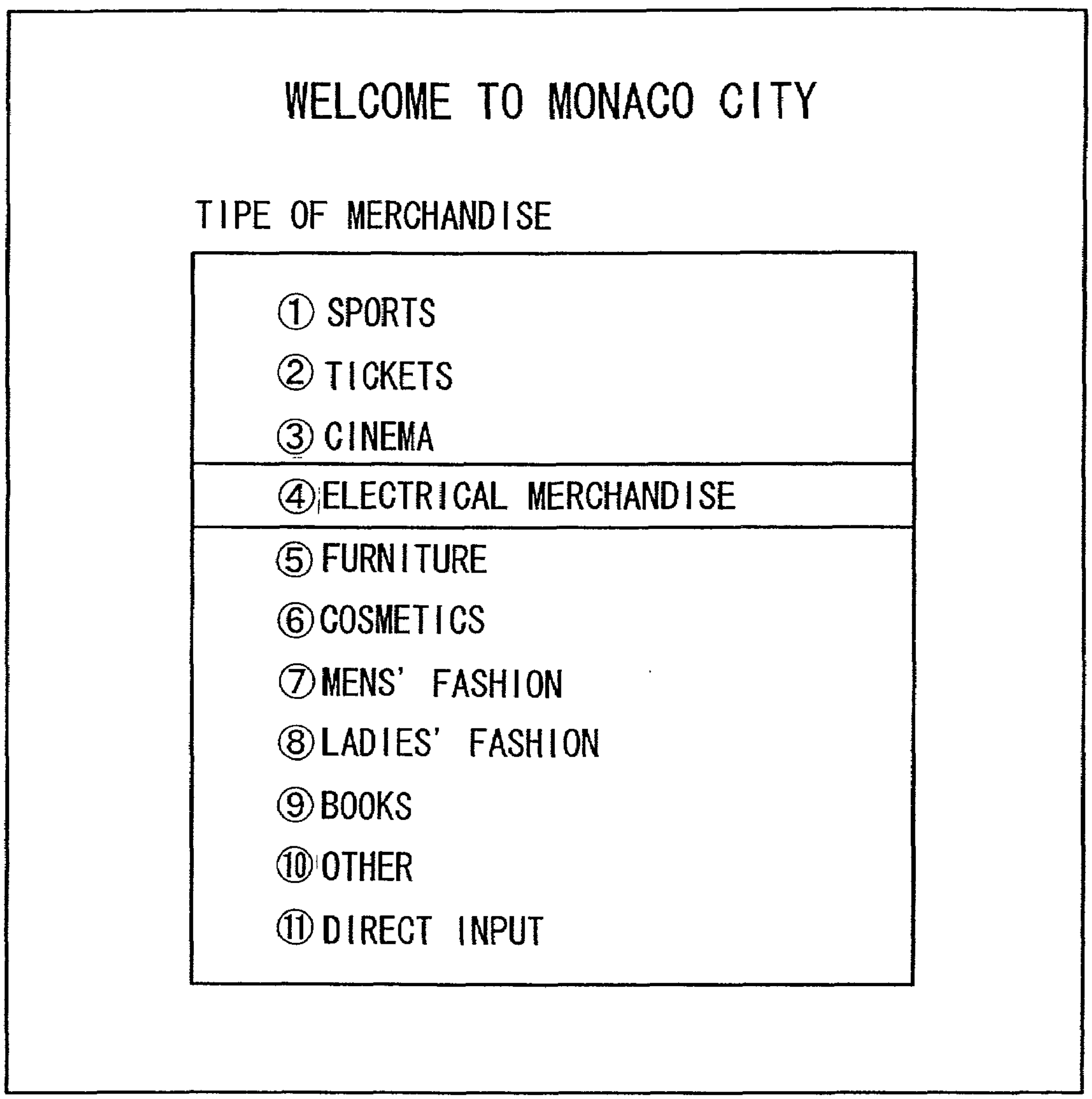
FIG. 13 is a figure showing an example of a screen display which is provided upon the participant terminal shown in FIG. 1.
Figure 14:
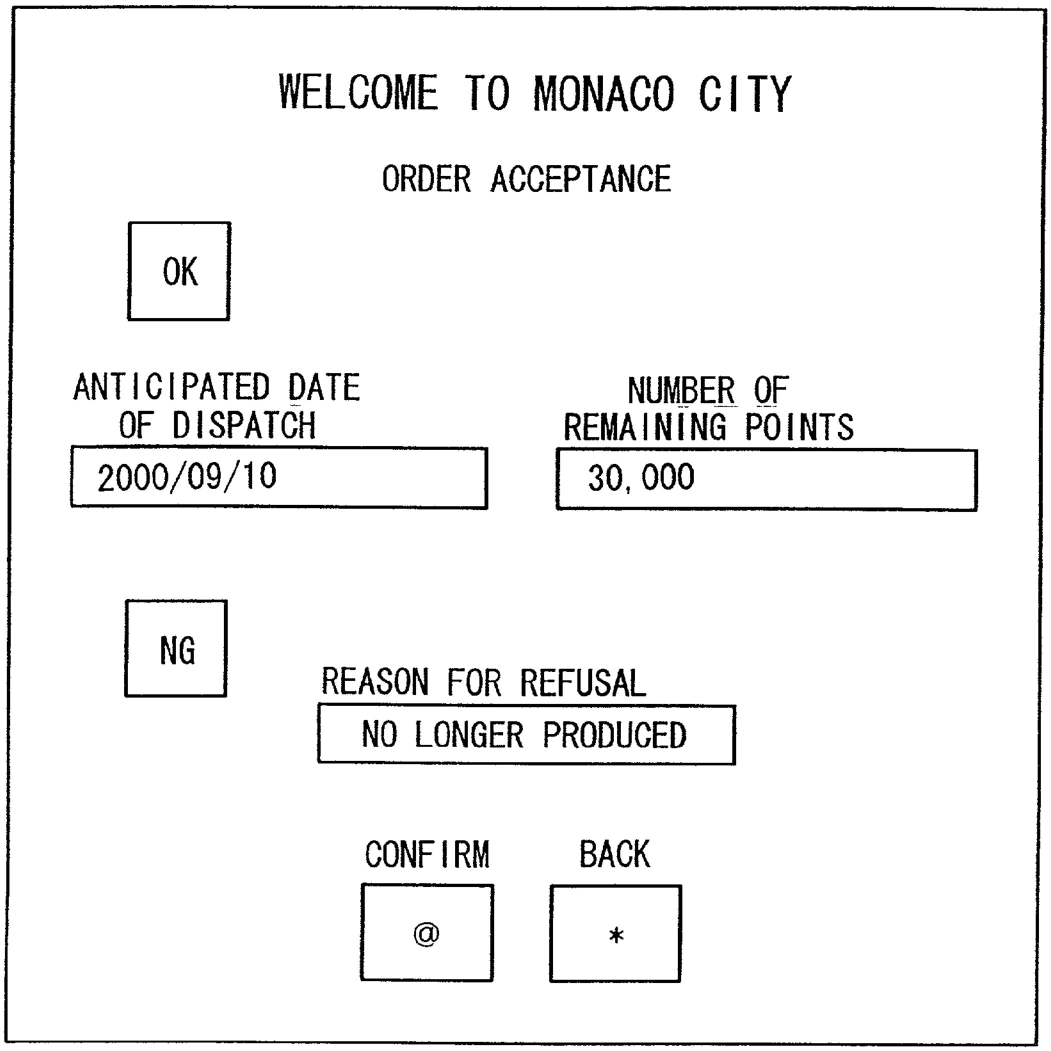
FIG. 14 is a figure showing an example of a screen display which is provided upon the participant terminal shown in FIG. 1.

Next, the "points cash in/exchange for merchandise" procedure in the step S33 shown in FIG. 6 will be explained. The game participant indicates his intention to cash in his points or to convert them into merchandise by clicking upon the "money" button or the "shop" button respectively on the display screen shown in FIG. 12. If (in a step S331) he clicks upon the "shop" button in order to convert his points into merchandise, then the screen shown in FIG. 13 is displayed.

While viewing this screen, the game participant operates the participant terminal 5 to select a type of merchandise (in a step S332) and to communicate with the member shop server 4. The member shop server 4 receives this communication and dispatches to the participant terminal 5 a list of appropriate member shops which purvey that type of merchandise, and the participant terminal 5 then invites the game participant to input (in a step S333) the name of the shop which he desires to patronize. When he does so, the home page of the desired shop is displayed upon the participant terminal 5 (in a step S334).

And the game participant selects upon this home page the merchandise which he desires, and issues an order for them (in a step S335). This causes the order acceptance screen shown in FIG. 14 to be displayed. Finally (in a step S340), if the merchandise order has been properly received and is in good order, the member shop server 4 displays the anticipated date of dispatch of the merchandise and the number of remaining points; while, if the required merchandise are past their "sell by" date, or production thereof has been terminated, or no stock is available, or the amount of points to the credit of the game participant is insufficient, then the member shop server 4 issues a refusal to the game participant along with an explanation of the reason for refusal.

Figure 15:
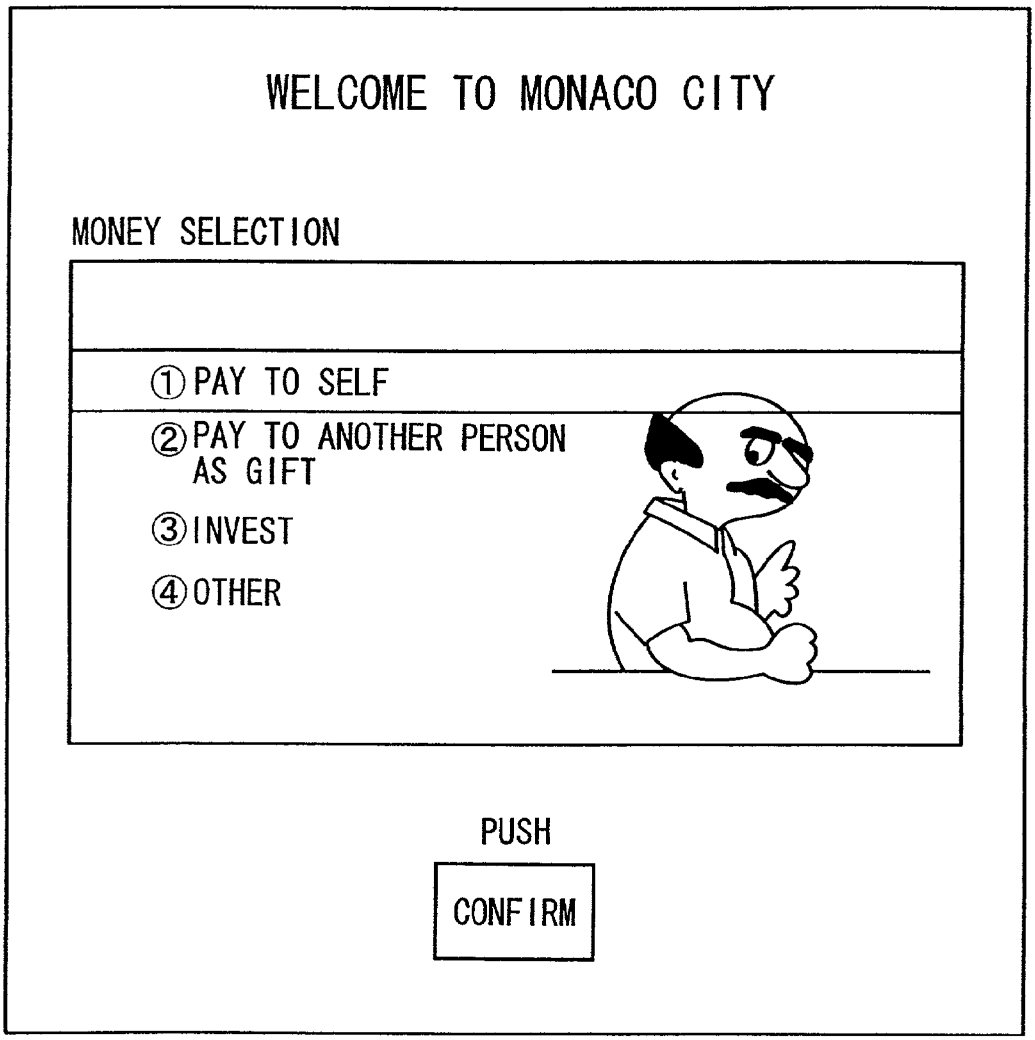
FIG. 15 is a figure showing an example of a screen display which is provided upon the participant terminal shown in FIG. 1.
Figure 16:
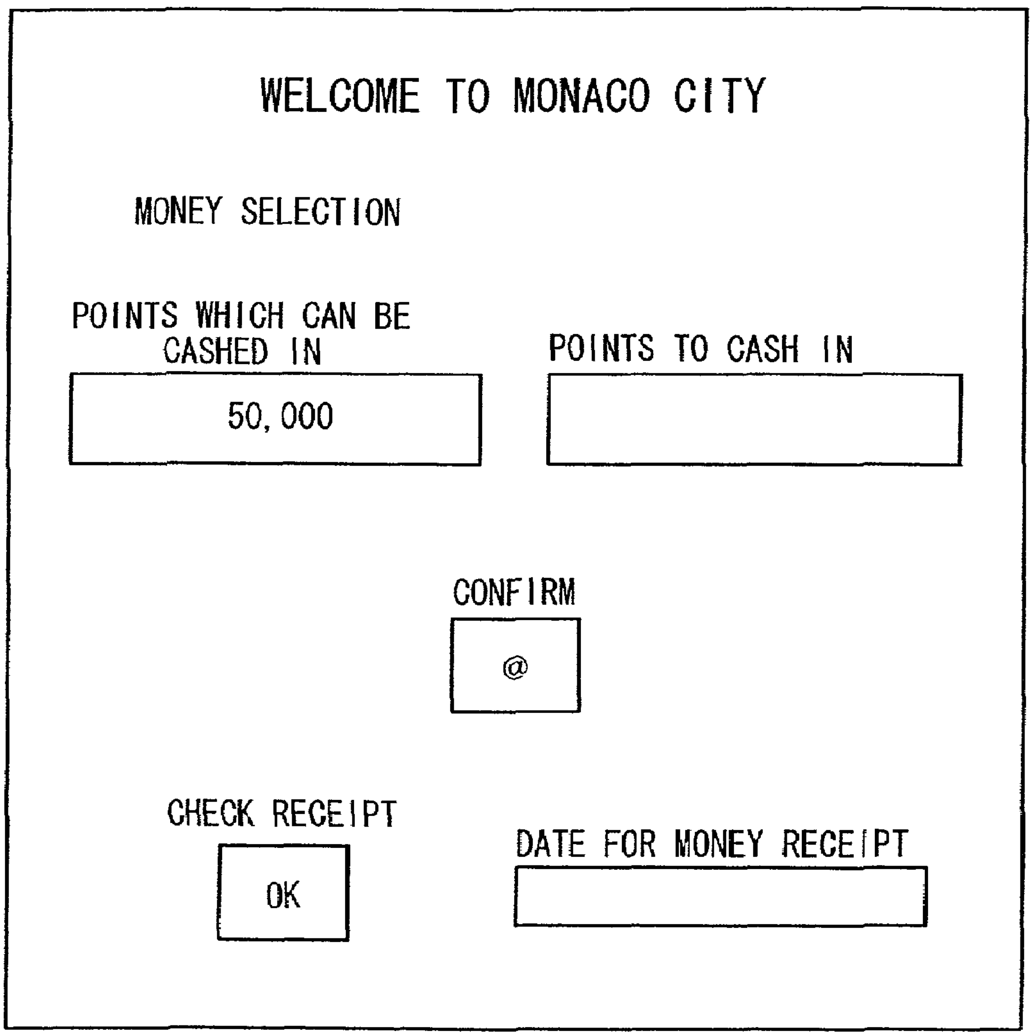
FIG. 16 is a figure showing an example of a screen display which is provided upon the participant terminal shown in FIG. 1.

On the other hand, if the game participant desires to cash in his points, then (in a step S336) the money selection screen shown in FIG. 15 is displayed. Here, when one or the other item is selected, the screen shown in FIG. 16 which specifies the number of point which can be cashed in by the member shop server 4 is displayed (in a step S337), and settlement is performed for the number of points to be cashed in as input by the game participant (in steps S338 and S339). When the game administration server 1 receives this information, along with calculating the number of points remaining, it communicates with the finance company server (in other words the bank server 2 or the credit company server 3) and performs various procedures for date of money receipt, money receipt communication, money receipt confirmation communication, and the like (in the step S340).

It should be understood that, with regard to points which are deducted during participation in a game or in exchange for merchandise, it is supposed that some protection mechanism is provided so that deduction of points for a subsequent event should not occur before the deduction of points for a previous event (setting of gambling points during participation in a game, points cashing in, or setting of exchange points for exchange with merchandise) has been completed.

According to the preferred embodiment of the present invention as described above, the game which is staged at the specified location is distributed in real time by a server via the transmission line, and an aspirant game participant who receives this game is able to participate in the game by entering into a conversation with the server via the terminal device and the transmission line. Furthermore, in particular, if the above described game is a competitive type game which is played by a plurality of game participants, it conveys a more tense feeling with regard to winning or losing, and a more realistic feeling of presence.

It should be understood that the network type game participation server system according to this preferred embodiment of the present invention may be constituted by recording programs for implementation of the functions with which the game distribution section 11, the man-machine control section 12, the time lag control section 13, and the points control section 14 of FIG. 2 are endowed upon a recording medium which can be read by a computer, by reading these programs which are recorded upon this recording medium into a computer system which is included in the server main unit 10, and by the computer system successively reading out and executing the above described programs. Furthermore, the term “computer system” in the above should be understood as including an OS and hardware such as peripheral components and the like.

Yet further, by “recording medium which can be read by a computer” is meant a portable medium such as a flexible disk, an opto-magnetic disk, a ROM, a CD-ROM or the like, or a memory device internal to the computer system such as a hard disk or the like. Moreover, this term “recording medium which can be read by a computer” should also be understood as including any device which stores a program during a fixed time, such as a volatile memory (RAM) internal to a computer system which constitutes a server or a client when this program is transmitted via a transmission line such as a network like the Internet, or a telephone line or the like.

Still further, it is acceptable, and should be understood as coming within the scope of the present invention, for the above described program to be transmitted from a computer system upon which this program is stored in a memory device or the like, to another computer system, via a transmission medium or by transmission waves within such a transmission medium. Here, by “transmission medium” which transmits this program is meant a medium which is endowed with the function of transmitting information, such as a transmission line like a network such as the Internet, or a telephone line or the like.

Even further, the above described program may be a program for implementing a portion of the above described functions. And, finally, it would also be acceptable for the above described functions to be implemented in combination with a program which is previously recorded in advance in a computer system, in other words by a so called differential file (differential program).

In the above specification the preferred embodiment of the present invention has been described in detail with reference to the appended drawings, but it should be understood that the concrete structure and function of any particular embodiment of the present invention is not to be limited by any of the details of this disclosed preferred embodiment, and that various alterations thereof are to be understood as coming within the scope of the present invention.

What is claimed is:

1. A method for participating in a network type game, comprising the steps of:

a game which is conducted at a specific location is distributed in real time over a transmission line via a server;

a person who desires to participate in the game receives the game via a terminal device; and the person participates in the game which is conducted at the specific location by conversing with the server via the transmission line, wherein, in the game which is distributed in real time, there is included reference time information which absorbs the time difference between the game which is conducted at the specific location and the game which is conducted upon the terminal device.

2. A method for participating in a network type game, comprising the steps of:

a game which is conducted at a specific location is distributed in real time over a transmission line via a server;

a person who desires to participate in the game receives the game via a terminal device; and the person participates in the game which is conducted at the specific location by conversing with the server via the transmission line, wherein the game which is distributed in real time from the server includes moving image data, or of data which is adequate for the terminal device to synthesize a moving image, and wherein, in the game which is distributed in real time, there is included reference time information which absorbs the time difference between the game which is conducted at the specific location and the game which is conducted upon the terminal device.

3. A method for participating in a network type game, comprising the steps of:

a game which is conducted at a specific location is distributed in real time over a transmission line via a server;

a person who desires to participate in the game receives the game via a terminal device; and the person participates in the game which is conducted at the specific location by conversing with the server via the transmission line, wherein protection is provided for points which are deducted due to participation in the game or due to exchange for merchandise so that deduction of points for a subsequent event does not occur before the deduction of points for a previous event has been completed.

4. A method for participating in a network type game, comprising the steps of:

a game which is conducted at a specific location is distributed in real time over a transmission line via a server;

a person who desires to participate in the game receives the game via a terminal device; and the person participates in the game which is conducted at the specific location by conversing with the server via the transmission line, wherein the game which is distributed in real time from the server includes moving image data, or of data which is adequate for the terminal device to synthesize a moving image, and wherein protection is provided for points which are deducted due to participation in the game or due to exchange for merchandise so that deduction of points for a subsequent event does not occur before the deduction of points for a previous event has been completed.

5. A network type game server system which is connected via a transmission line to a terminal device which is operated by a person who desires to participate in a game which is conducted at a specific location, comprising:

a game distribution section which distributes the game which is conducted at the specific location via the transmission line in real time; and a man-machine control section which performs conversation with the person who wishes to participate in the game via the terminal device, permits the person to participate in the game which is conducted at the specific location, and controls the progress of the game, wherein time information to be used as reference is included in the game distributed as moving images, and the network type game server system further comprises a time lag control section which absorbs the time difference between the game which is conducted at the specific location and the game which is conducted upon the terminal device by using the time information.

6. A network type game server system which is connected via a transmission line to a terminal device which is operated by a person who desires to participate in a game which is conducted at a specific location, comprising:

a game distribution section which distributes the game which is conducted at the specific location via the transmission line in real time;

a man-machine control section which performs conversation with the person who wishes to participate in the game via the terminal device, permits the person to participate in the game which is conducted at the specific location, and controls the progress of the game; and a points control section which provides protection for points which are deducted due to participation in the game or due to exchange for merchandise so that deduction of points for a subsequent event does not occur before the deduction of points for a previous event has been completed.

7. A recording medium upon which is recorded a server program which can be read by a computer which is employed in a network type game server system which is connected via a transmission line to a terminal device which is operated by a person who desires to participate in a game which is conducted at a specific location, wherein the server program includes a first step of distributing the game which is conducted at the specific location via the transmission line in real time, and a second step of performing conversation with the person who wishes to participate in the game via the terminal device, permitting the person to participate in the game which is conducted at the specific location, and controlling the progress of the game, and wherein the second step includes a step of absorbing the time difference between the game which is conducted at the specific location and the game which is conducted upon the terminal device, using time information to be used as reference which is included in the game distributed as moving images.

8. A recording medium upon which is recorded a server program which can be read by a computer which is employed in a network type game server system which is connected via a transmission line to a terminal device which is operated by a person who desires to participate in a game which is conducted at a specific location, wherein the server program includes a first step of distributing the game which is conducted at the specific location via the transmission line in real time, and a second step of performing conversation with the person who wishes to participate in the game via the terminal device, permitting the person to participate in the game which is conducted at the specific location, and controlling the progress of the game, and wherein the second step includes a step of providing protection for points which are deducted due to participation in the game or due to exchange for merchandise so that deduction of points for a subsequent event does not occur before the deduction of points for a previous event has been completed.

* * * * *